United States Patent
Isaacson

(10) Patent No.: US 10,684,597 B2
(45) Date of Patent: *Jun. 16, 2020

(54) CONTROLLING LOADS AND COLLECTING BUILDING INFORMATION VIA IP NETWORKS

(71) Applicant: NuLEDs, Inc., Carlsbad, CA (US)

(72) Inventor: Chris A. Isaacson, Encinitas, CA (US)

(73) Assignee: NuLEDs, Inc., Carlsbad, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/998,215

(22) Filed: Jul. 16, 2018

(65) Prior Publication Data
US 2019/0056703 A1 Feb. 21, 2019

Related U.S. Application Data

(63) Continuation of application No. 13/920,569, filed on Jun. 18, 2013, now Pat. No. 10,025,279.

(51) Int. Cl.
*G05B 15/02* (2006.01)

(52) U.S. Cl.
CPC .... *G05B 15/02* (2013.01); *G05B 2219/21042* (2013.01); *G05B 2219/25111* (2013.01); *G05B 2219/25168* (2013.01); *G05B 2219/2642* (2013.01)

(58) Field of Classification Search
CPC .......... G05B 15/02; G05B 2219/21042; G05B 2219/25111; G05B 2219/25168; G05B 2219/2642
See application file for complete search history.

(56) References Cited

U.S. PATENT DOCUMENTS

| | | | | |
|---|---|---|---|---|
| 6,085,238 A | * | 7/2000 | Yuasa | H04L 12/4641 370/409 |
| 6,331,983 B1 | * | 12/2001 | Haggerty | H04L 12/185 370/400 |
| 6,483,832 B1 | * | 11/2002 | Civanlar | H04L 12/1886 370/390 |
| 6,806,659 B1 | * | 10/2004 | Mueller | F21K 9/00 315/295 |

(Continued)

OTHER PUBLICATIONS

Office Action for parent case U.S. Appl. No. 13/920,569 dated Jul. 6, 2017 (Year: 2017).*

*Primary Examiner* — Michael J Huntley
(74) *Attorney, Agent, or Firm* — Robroy R. Fawcett

(57) ABSTRACT

The subject matter disclosed herein provides methods for controlling loads in an IP network that is divided into one or more zones and/or subzones. In one aspect, there is provided a method that can associate a plurality of controllers with one of a plurality of zones. Each controller can be connected to one or more loads. The method can associate each controller with an address. The address can include a network address and a host identifier. The network address for each controller in a first zone can be the same. The method can transmit over a network a control message to each controller in the first zone. The control message can cause one or more operational parameters of the loads connected to each controller in the first zone to change. Related apparatus, computer program products, systems, techniques, and articles are also described.

8 Claims, 5 Drawing Sheets

(56) References Cited

U.S. PATENT DOCUMENTS

| | | | | |
|---|---|---|---|---|
| 6,839,348 B2* | 1/2005 | Tang | ............... | H04L 12/18 370/390 |
| 7,016,351 B1* | 3/2006 | Farinacci | ............... | H04L 45/00 370/312 |
| 7,181,503 B2* | 2/2007 | Choi | ............... | H04L 29/12009 709/218 |
| 8,243,278 B2* | 8/2012 | Valois | ............... | H05B 37/0254 356/213 |
| 8,278,845 B1* | 10/2012 | Woytowitz | ............... | H05B 37/0263 307/1 |
| 8,373,362 B2* | 2/2013 | Chemel | ............... | H05B 37/029 315/297 |
| 8,548,607 B1* | 10/2013 | Belz | ............... | G06F 7/00 700/21 |
| 8,705,528 B2* | 4/2014 | Yadav | ............... | H04L 12/1886 370/389 |
| 8,805,550 B2* | 8/2014 | Chemel | ............... | H05B 37/029 315/51 |
| 8,823,277 B2* | 9/2014 | Chemel | ............... | H05B 37/029 315/152 |
| 8,841,859 B2* | 9/2014 | Chemel | ............... | H05B 37/029 315/291 |
| 8,866,408 B2* | 10/2014 | Chemel | ............... | H05B 37/029 315/291 |
| 8,954,170 B2* | 2/2015 | Chemel | ............... | H05B 37/029 315/297 |
| 9,066,381 B2* | 6/2015 | Valois | ............... | H05B 37/0227 |
| 9,612,585 B2* | 4/2017 | Aggarwal | ............... | H05B 47/105 |
| 10,025,279 B2* | 7/2018 | Isaacson | ............... | G05B 15/02 |
| 2001/0036834 A1* | 11/2001 | Das | ............... | H04W 36/0011 455/458 |
| 2004/0215750 A1* | 10/2004 | Stilp | ............... | G06K 7/0008 709/220 |
| 2005/0246408 A1* | 11/2005 | Chung | ............... | H04L 12/2803 709/200 |
| 2006/0095146 A1* | 5/2006 | Hesse | ............... | G05B 15/02 700/19 |
| 2008/0313316 A1* | 12/2008 | Hite | ............... | H04L 12/2803 709/223 |
| 2009/0040042 A1* | 2/2009 | Lontka | ............... | G08B 7/06 340/539.13 |
| 2009/0105846 A1* | 4/2009 | Hesse | ............... | G05B 15/02 700/1 |
| 2010/0106308 A1* | 4/2010 | Filbeck | ............... | G05B 15/02 700/276 |
| 2010/0106787 A1* | 4/2010 | Grohman | ............... | G05B 15/02 709/206 |
| 2010/0217837 A1* | 8/2010 | Ansari | ............... | H04L 63/08 709/218 |
| 2010/0324962 A1* | 12/2010 | Nesler | ............... | G01R 21/133 705/7.36 |
| 2012/0026726 A1* | 2/2012 | Recker | ............... | F21S 9/037 362/157 |
| 2012/0136485 A1* | 5/2012 | Weber | ............... | G05B 15/02 700/275 |
| 2013/0184880 A1* | 7/2013 | McMahon | ............... | G05B 15/02 700/286 |
| 2014/0354187 A1* | 12/2014 | Aggarwal | ............... | G05B 15/02 315/312 |

* cited by examiner

| | Binary Form | Dot-Decimal Notation |
|---|---|---|
| IP Address | 11000000.10101000.00000101.10000010 | 192.168.5.130 |
| Subnet Mask | 11111111.11111111.11111111.00000000 | 255.255.255.0 |
| Network Address | 11000000.10101000.00000101.00000000 | 192.168.5.0 |
| Host Identifier | 00000000.00000000.00000000.10000010 | 0.0.0.130 |

CONTROLLING LOADS AND COLLECTING BUILDING INFORMATION VIA IP NETWORKS

TECHNICAL FIELD

The subject matter described herein relates to the control of various loads in an Internet Protocol (IP) network that is divided into one more zones and/or subzones.

BACKGROUND

Lighting network design involves the commissioning and installation of lighting units in a building. In conventional lighting networks, a manually operated single switch or dimmer is used to control a set of lights. These networks can result in a large number of switches and dimmers that can make it difficult to adjust each set of lights to the desired brightness for different occasions. This can be true in large residential or commercial settings that require different lighting conditions in different zones of a building. For example, in an office building having multiple conference rooms, offices, hallways, and reception areas, the lighting conditions in each zone can change depending on the needs of the occupants. Whereas a main lobby area can remain lit throughout the day, a sporadically occupied conference room can be lit only when people are present. Other considerations including, for example, the amount of ambient light from external sources and energy conservation policies can also affect lighting and energy usage in these zones.

SUMMARY

In some implementations, methods and apparatus, including computer program products, are provided for controlling various loads in an IP network that is divided into one more zones and/or subzones.

In one aspect, a plurality of controllers is associated, by at least one data processor, with one of a plurality of zones. Each of the plurality of controllers is connected to one or more loads. Each of the plurality of controllers is associated, by the at least one data processor, with an address. The address includes a network address and a host identifier. The network address for each controller in a first zone is the same. A control message is transmitted over a network, by the at least one data processor, to each of the one or more controllers in the first zone. The control message causes one or more operational parameters of the one or more loads connected to each of the one or more controllers in the first zone to change.

The above methods, apparatus, computer program products, and systems can, in some implementations, further include one or more of the following features.

The transmitting can further include addressing the control message to a broadcast address associated with a subnet of the zone.

Environmental data can be received from the one or more controllers. The control message can be based at least on the received environmental data. The environmental data can be detected by one or more sensors connected to each of the one or more controllers.

The address for each of the plurality of controllers can be a statically assigned. IP address or a dynamically assigned IP address.

Each zone can be associated with two or more subzones. Each of the plurality of controllers can be associated with a subzone parameter. The subzone parameter can represent a subzone that each controller is located in. The control message can cause the operational parameters of the one or more loads connected to a subset of the controllers in the first zone to change. The subset of controllers can be indicated by the subzone parameter in the control message.

Computer program products are also described that comprise non-transitory computer readable media storing instructions, which when executed one or more data processor of one or more computing systems, causes at least one data processor to perform operations herein. Similarly, computer systems are also described that can include one or more data processors and a memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

It is to be understood that both the foregoing general description and the following detailed description are exemplary and explanatory only and are not restrictive. Further features and/or variations can be provided in addition to those set forth herein. For example, the implementations described herein can be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

Different areas in a building can have different lighting, temperature, and other environmental needs. In order to accommodate these needs, this application discloses a load network having one or more zones, each zone corresponding to a subnetwork. In some implementations, each zone can be further subdivided into subzones. A main host can control various environmental characteristics (e.g., lighting, temperature, and the like) associated with each zone and/or subzone by transmitting control messages to control the loads in the desired subnetwork.

Figure 1:
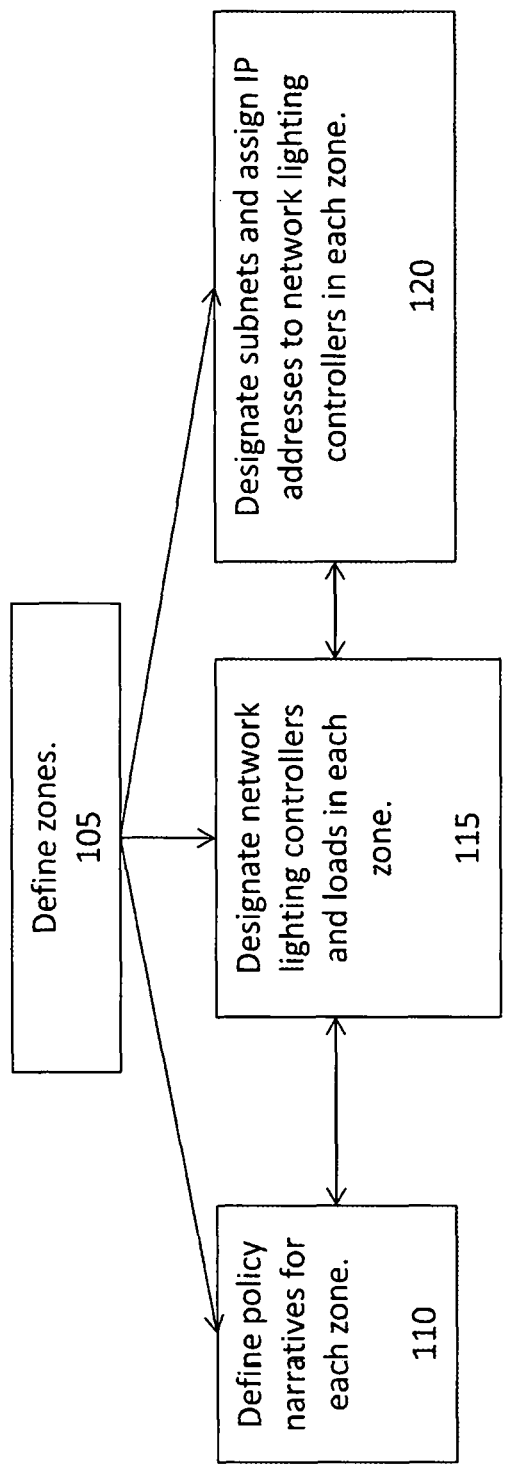
FIG. 1 illustrates a process for designing a load network.

FIG. 1 illustrates a process for designing a load network in a building. This process can begin at phase 105 with the definition of different zones. There are many types of zones. Zones can include hallways, private offices, common areas, restrooms, lobbies, and the like. A facilities administrator can define these zones in accordance with the building's floor plan such that each separate space corresponds to a zone. Other arrangements can also be possible including, for example, the subdivision of a single room into multiple zones. These zone definitions can be stored in the memory of a main host.

Phases 110, 115, and 120 collectively describe the set-up of the loads in a load network. This set-up can involve the specification of one or more network lighting controller and load locations, IP addresses, and usage. Phases 110, 115, and 120 can be executed in any order. In some implementations, these phases can be executed concurrently. Although each phase is described primarily with respect to the set-up of a plurality of lighting unit loads, the description also extends to other types of loads including, for example, heating, ventilation, and air conditioning (HVAC) controls, window coverings, and the like.

Commissioning can begin at 110. During the commissioning process, a facilities administrator can define one or more policy narratives for each zone. These policy narratives can define the usage of various loads in the zone. Policy narratives can be stored in the form of one or more IF-THEN statements and network lighting controller commands that can be wrapped in one or more IP packets. An example policy narrative can reduce the illumination intensity of all lighting loads in a particular zone by 25% between pre-designated hours. This policy narrative can be useful in conserving energy if a particular zone receives a large amount of external light from ambient sources during the day. Another example policy narrative can turn on the air conditioning system in a particular zone when the zone temperature exceeds a predetermined threshold. Commissioning software can be used to formulate these policy narratives. These policy narratives can be stored in the memory of a main host and used by the main host to control the operation of the loads in a zone. Building data can be stored and analyzed to optimize the narratives for maximizing the building systems' efficiencies. For example, temperature data can be collected from sensors in different zones of a building and stored at the main host. The main host can be configured to analyze this data to determine, for example, the average temperature in various zones of a building during the day and how this temperature varies throughout the year. The main host can be configured to modify the policy narrative based on this analysis to account for seasonal variations in temperature which, in turn, can affect the operation of the loads in the zone. For example, based on an analysis of historical temperature data for a particular zone, the main host may modify a policy narrative to increase the flow of air conditioning from HVAC loads into the zone during warmer months and to decrease the same during cooler months. In some implementations, the adjusting of policy narratives can be manually performed by an administrator. Other types of sensor data that can be stored and analyzed by the main host include zone humidity levels, the amount of light that enters a zone from external sources, zone occupancy frequency, zone water usage, zone power usage, and the like. The building data can also be stored, analyzed, processed, and shared with other building information and control systems that do not reside on the network.

Figures 2, 3:
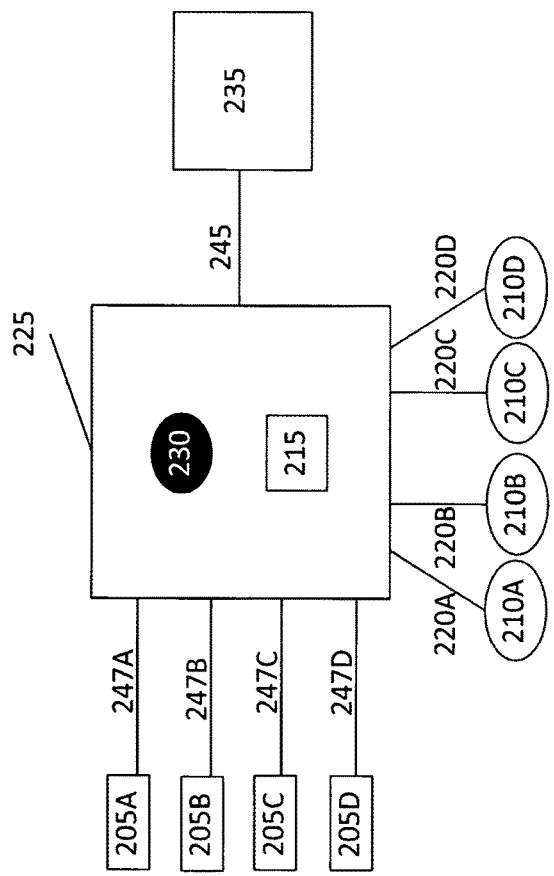
FIG. 2 illustrates a simplified load network.
FIG. 3 illustrates the division of a network lighting controller's IP address into a network address and a host identifier.

At 115, a facilities administrator can specify the number and location of loads and network lighting controllers to be installed in each zone of the load network. FIG. 2 illustrates a simplified load network that can include loads 205A, 205B, 205C, and 205D, a network lighting controller 225, sensors 210A, 210B, 210C, and 210D, and a main host 235.

Loads 205A, 205B, 205C, and 205D can connect to network lighting controller 225 via wired or wireless connections 247A, 247B, 247C, and 247D, respectively. Sensors 210A, 210B, 210C, and 210D can be connected to the network lighting controller 225 via wired or wireless connections 220A, 220B, 220C, and 220D, respectively. In some implementations, the wired connections can be an RJ11 connection or other registered jack.

Sensors 210A, 210B, 210C, and 210D can detect various environmental characteristics associated with the zone that network lighting controller 225 resides in including, for example, temperature, motion, gas levels (e.g., CO, $CO_2$, radon), zone humidity, and the like. In some implementations, sensors 210A, 210B, 210C, and 210D can be configured to receive manual inputs from a user and/or environmental data from loads 205A, 205B, 205C, and 205D. Although the implementation of FIG. 2 illustrates four sensors and four loads, any number of loads and sensors can be used. In some implementations, an unequal number of loads and sensors may be used (e.g., three sensors and two loads).

The environmental data detected by sensors can be used by a main host to control the loads in a particular zone. For example, sensor 210A can be configured as a motion detector. If motion is detected, sensor 210A can transmit motion data to network lighting controller 225 which, in turn, can transmit this data to main host 235 via connection 245. Connection 245 may be a wired (e.g., Ethernet cable) or a wireless connection. In some implementations, a network switch and/or router may be disposed between network lighting controller 225 and main host 235. This configuration may be used in large networks involving multiple zones and multiple network lighting controllers 225. In this configuration, the switch and/or router can transmit the environmental data from the network lighting controller to the main host.

Upon receiving this data, main host 235 can check the policy narratives associated with the zone in which network lighting controller 225 resides to determine if a particular policy narrative is triggered. The triggered policy narrative can, for example, indicate that all lighting units in the zone should be turned on. In some implementations, one or more policy narratives can apply. Main host 235 can then send a control message representative of the triggered policy narrative to network lighting controller 225.

Microcontroller 215 in network lighting controller 225 can control the operation of loads 205A, 205B, 205C, and 205D in accordance with the control message received from main host 235. The control message can identify the loads to be controlled as well as adjustments to the operational parameters of these loads as disclosed in co-owned U.S. Pat. No. 8,344,641, the contents of which are incorporated herein by reference in their entirety for all purposes. Microcontroller 215 can comprise logic circuitry configured to execute program code to control loads 205A, 205B, 205C, and 205D. The logic circuitry can be implemented as software, hardware, or a combination of software and hardware. If, for example, loads 205A, 205B, 205C, and 205D are lighting units, microcontroller 215 can adjust the illumination intensity, fade time, or illumination pattern of each lighting unit in accordance with the control message.

In another example, sensor 210B can be configured as a temperature sensor that periodically measures the temperature of the zone in which its associated network lighting controller 225 resides. This temperature data can be transmitted to network lighting controller 225. Network lighting controller 225 can, in turn, transmit this data to main host 235 which, in turn, can determine whether a policy narrative for this particular zone applies. This policy narrative can, for example, indicate that if the zone temperature exceeds a predetermined threshold, then the loads located in the zone should be adjusted to lower the temperature back to a predetermined level. Main host 235 can send a control message representative of the policy narrative to network lighting controller 225. Microcontroller 215 can use this control message to, for example, adjust the position of a variable air valve load 205B to increase the flow of air into the zone or adjust window covering load 205C (e.g., a window shade or window tint) to reduce the amount of sunlight entering the zone.

Returning to FIG. 1, at phase 120 a network administrator can assign an IP address to each network lighting controller 225 in the building's network. Main host 235 can transmit a control message to a particular network lighting controller 225 using the controller's IP address. This IP address can be an identifier associated with a network lighting controller's permanent MAC address.

In some implementations, the network administrator can manually assign static IP addresses to network lighting controllers in the IP load network. These IP addresses may be stored at main host 235. The network administrator can select these IP addresses in a manner that is compatible with the overall information technology (IT) plan for the building.

In some implementations, IP addresses can be assigned by a server using Dynamic Host Configuration Protocol (DHCP). A dynamic address can be assigned, for example, when the network lighting controller and its respective loads are connected to the network for the first time. When this occurs, the network administrator can replace the network lighting controller's dynamically assigned IP address with the manually entered IP address stored at main host 235. The network administrator can press button 230 on network lighting controller 225 to initiate address replacement.

During IP address assignment phase 120, the IP load network can be divided into smaller subnetworks or subnets. Each subnet can correspond to a zone in the building. The size of the subnet can depend on various factors including the number of network lighting controllers and loads to be installed in the zone, the desired granularity of the network, and the like.

The subnet that each network lighting controller belongs to can be represented in the network lighting controller's IP address. An IP address consists of four bit groups of zeros and ones with a single dot (.) separating each bit group. Each IP address can be divided into a network address and a host identifier. All network lighting controllers that belong to the same subnet (i.e., the same zone) can have the same network address (i.e., the same most-significant bit-group in the IP address). A subnet mask can be applied to the IP address to separate the network address from the host identifier.

FIG. 3 illustrates the division of a network lighting controller's IP address into its separate components. In this example, a bitwise logical AND operation can be performed on IP address 305 and subnet mask 310. This operation can yield network address 315 (i.e., 192.168.5.0). Host identifier 320 (i.e., 0.0.0.130) can identify a specific network lighting controller in the subnet.

Although the example of FIG. 3 is specific to a single network lighting controller in a subnet, this subnet can include additional network lighting controllers. These additional network lighting controllers can all have the same network address (i.e., 192.168.5.0) but different host identifiers.

Figure 4:
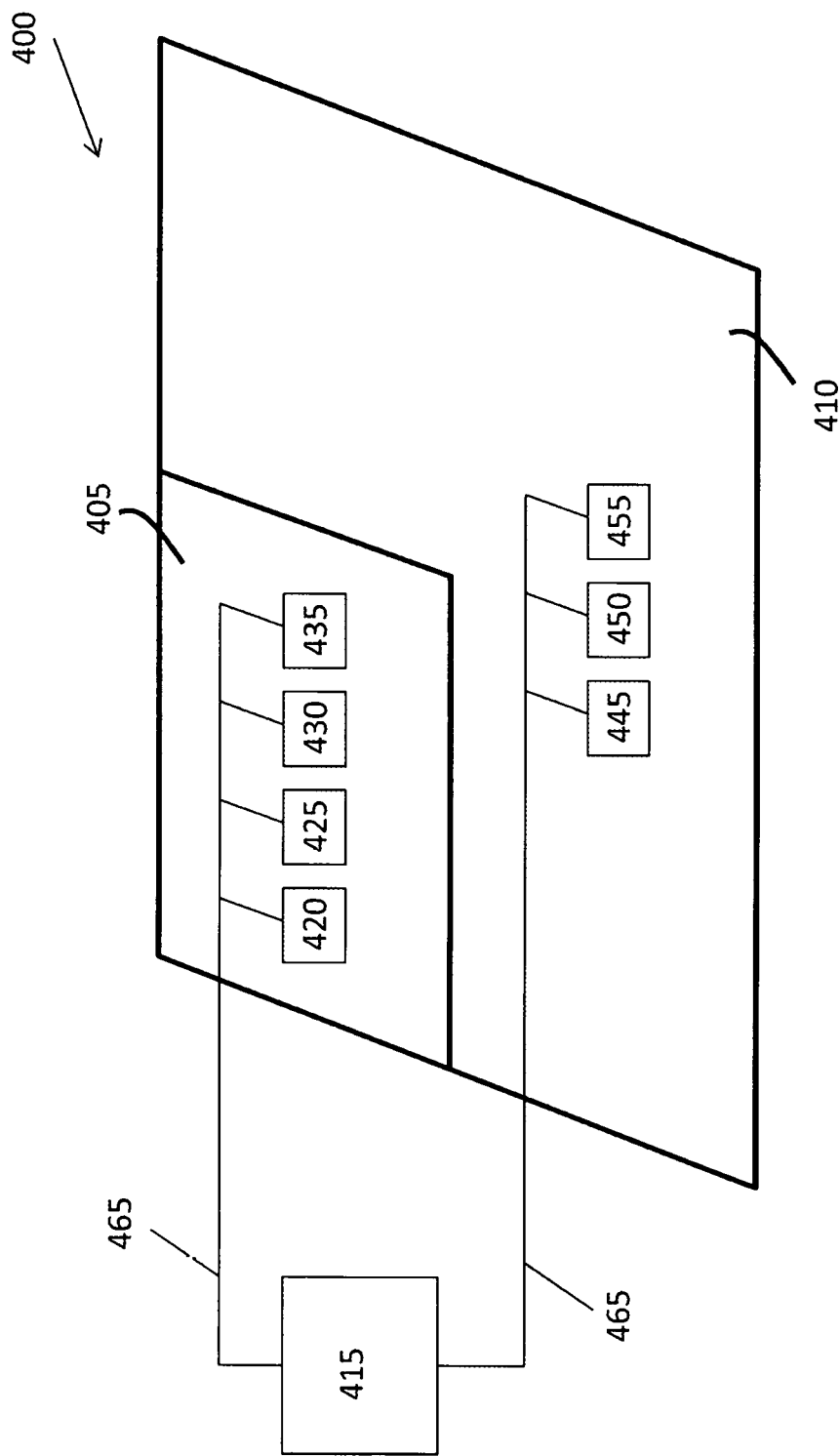
FIG. 4 illustrates a load network divided into two zones.

FIG. 4 illustrates the division of a load network 400 into two zones 405 and 410. Zone 405 can include network lighting controllers 420, 425, 430, and 435. Zone 410 can include network lighting controllers 445, 450, and 455. Each network lighting controller 420-455 can have one or more loads, and each network lighting controller can be connected to main host 415 via Ethernet connection 465. In some implementations, a WiFi network can wirelessly connect network lighting controllers 420-455 with main host 415. In some implementations, a switch and/or router may be disposed between the network lighting controllers 420-455 and the main host 415.

Network lighting controllers 420-455 can be reside in two different subnets. A first subnet can be used for network lighting controllers 420, 425, 430, and 435 in zone 405. A second subnet can be used for network lighting controllers 445, 450, and 455 in zone 410. Table 1 shows example IP addresses that can be assigned to network lighting controllers 420-455. These addresses can be stored at main host 415 when IP addresses are assigned during phase 120.

TABLE 1

| Network Lighting Controller IP Addresses | |
|---|---|
| Network Lighting Controller | IP Address |
| Zone 405 (network address = 192.62.123.16; broadcast address = 192.62.123.31) | |
| 420 | 192.62.123.17 |
| 425 | 192.62.123.18 |
| 430 | 192.62.123.19 |
| 435 | 192.62.123.20 |
| Zone 410 (network address = 192.62.123.112; broadcast address = 192.63.123.127) | |
| 445 | 192.62.123.113 |
| 450 | 192.62.123.114 |
| 455 | 192.62.123.115 |

Because the network lighting controllers in zone 405 belong to the same subnet, each network lighting controller can have the same network address (i.e., 192.62.123.16). Likewise, because the network lighting controllers in zone 410 belong to the same subnet, each network lighting controller can have the same network address (i.e., 192.62.123.112).

A message can be sent to each network lighting controller in a subnet or zone by addressing the message to the subnet's broadcast address. The last address in a subnet is reserved as the broadcast address. With regard to zone 405, the subnet starting at 192.62.123.16 can have 16 available IP addresses. As such, the broadcast address for zone 405 (i.e., the last available IP address) is 192.62.123.31. With regard to zone 410, the subnet starting at 192.62.123.112 can have 16 available IP addresses. As such, the broadcast address for zone 410 (i.e., the last available IP address) is 192.63.123.127.

During operation of load network 400, main host 415 can transmit control messages to the network lighting controllers to control the controllers' respective loads in accordance with policy narratives stored at the main host. Main host 415 can send individually addressed control messages to control each network lighting controller 420-455 using the IP addresses shown in Table 1. Alternatively, main host 415 can send a single control message to control all network lighting controllers in a particular zone by sending the control message to the zone's broadcast address.

In one example, main host 415 can control the loads in zone 405 in accordance with a holiday lighting policy narrative. This narrative can have, for example, lighting loads connected to the network lighting controllers in zone 405 turn off their white lights and turn on flashing red and green lights when the zone becomes unoccupied. To implement this lighting effect, a motion sensor can be connected to one or more of network lighting controllers 420, 425, 430, and 435. The motion sensor can transmit motion data to its respective network lighting controller which, in turn, can transmit this data to main host 415 along with the network lighting controller's IP address.

If, for example, main host 415 receives motion data from network lighting controller 420 that indicates that zone 405 is unoccupied, then the main host can send a control message to the one or more network lighting controllers in the zone. The one or more network lighting controllers can, in turn, control the lights in the zone in accordance with the holiday lighting policy narrative.

Using the IP addresses shown in Table 1, main host 415 can look up the broadcast address for the subnet (i.e., zone) in which network lighting controller 420 resides. Upon determining this address, main host 415 can send a single control message to the broadcast address for the subnet (i.e., 192.62.123.31). Network lighting controllers 420, 425, 430, and 435 can receive this control message, and the microcontroller in each network lighting controller can control the controller's respective lighting loads in accordance with the contents of the control message (i.e., by turning off their white lights and turning on flashing red and green lights). Alternatively, main host 415 can send separate control messages to network lighting controllers 420, 425, 430, and 435. Each of these separate control messages can be sent to the IP addresses shown in Table 1, for example. Upon receiving a control message, each network lighting controller 420, 425, 430, and 435 can control its respective lighting loads in accordance with the holiday lighting policy narrative as represented in the control message.

In another example, main host 415 can control the loads in zone 410 in accordance with a policy narrative for energy conservation. This policy narrative can have lighting units in non-critical areas reduce their lighting power by 30% when a demand response is received from a utilities company. If, for example, zone 410 is designated as a non-critical area in the policy narrative, main host 415 can send a single control message to the broadcast address for the subnet (i.e., 192.63.123.127) to reduce the power of lighting loads attached to network lighting controllers 445, 450, and 455 in accordance with the policy narrative. Network lighting controllers 445, 450, and 455 can receive this control message, and the microcontroller in each network lighting controller can control the controller's respective lighting loads in accordance with the contents of the control message. Alternatively, main host 415 can send separate control messages to network lighting controllers 445, 450, and 455. Each of these separate control messages can be sent to the IP addresses shown in Table 1, for example. Upon receiving a control message, each network lighting controller 420, 425, 430, and 435 can control its respective lighting loads in accordance with the energy conservation policy narrative as represented in the control message.

Figure 5:
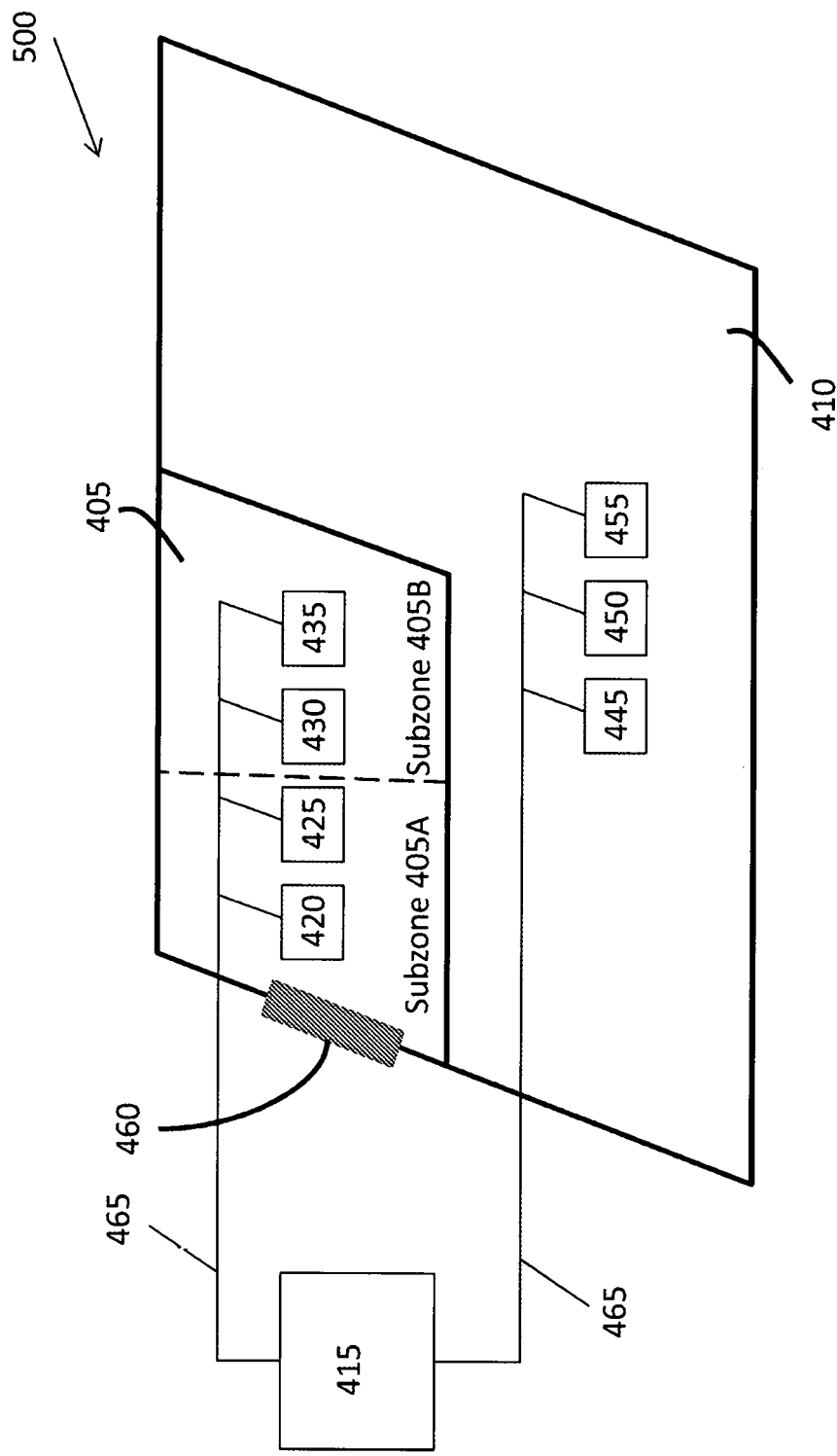
FIG. 5 illustrates the load network of FIG. 4 and the subdivision of one of the zones into two subzones.

FIG. 5 illustrates a load network 500 similar to the load network of FIG. 4. In load network 500, however, zone 405 can be further divided into subzones 405A and 405B. Dividing a zone into subzones can provide tailored control of loads in different areas of a single zone. Subzoning can be useful in a space that has multiple uses or needs.

For example, zone 405 can correspond to a conference room that has a window 460. If window 460 allows in external light, then the illumination intensity of the loads closest to the window (e.g., lighting loads associated with network lighting controllers 420 and 425 in subzone 405A) can be set at a lower level than the illumination intensity of loads that are farther away (e.g., lighting loads associated with network lighting controllers 430 and 435 in subzone 405B). Each network lighting controller can be set with a subzone parameter that indicates the subzone that the network lighting controller belong to. Subzone parameters can be set during phase 115 when network lighting controller and load locations are designated or during phase 120 when IP addresses are assigned to each load and network lighting controller. These subzone assignments can be incorporated into the policy narratives for the zone during phase 110. Network lighting controllers that belong to the same zone but different subzones can have different subzone parameters. However, these network lighting controllers can share the same network address and the same broadcast address because they reside within the same zone.

The subzoning illustrated in FIG. 5 can be useful, for example, if subzones 405A and 405B correspond to different rooms in zone 405. If a presentation is being held in subzone 405B, then main host 415 can use a presentation lighting narrative to dim the lights in subzone 405B while leaving the lights in subzone 405A alone. This can be done by incorporating the subzone parameters of the network lighting controllers 430 and 435 into the policy narrative and control message.

When this policy narrative is triggered, main host 415 can send a control message to the broadcast address for zone 405 to control the lighting unit loads in the zone. Network lighting controllers 420, 425, 430 and 435 can receive this control message, and the microcontroller in the network lighting controllers can control the respective lighting unit loads in accordance with the contents of the control message. However, only network lighting controllers 430 and 435 can dim their respective lighting unit loads because only their subzone parameters may be specified in the control message. Lighting unit loads associated with network lighting controllers 420 and 425 can remain unaffected if, for example, their subzone parameters are not specified in the control message.

Figure 6:
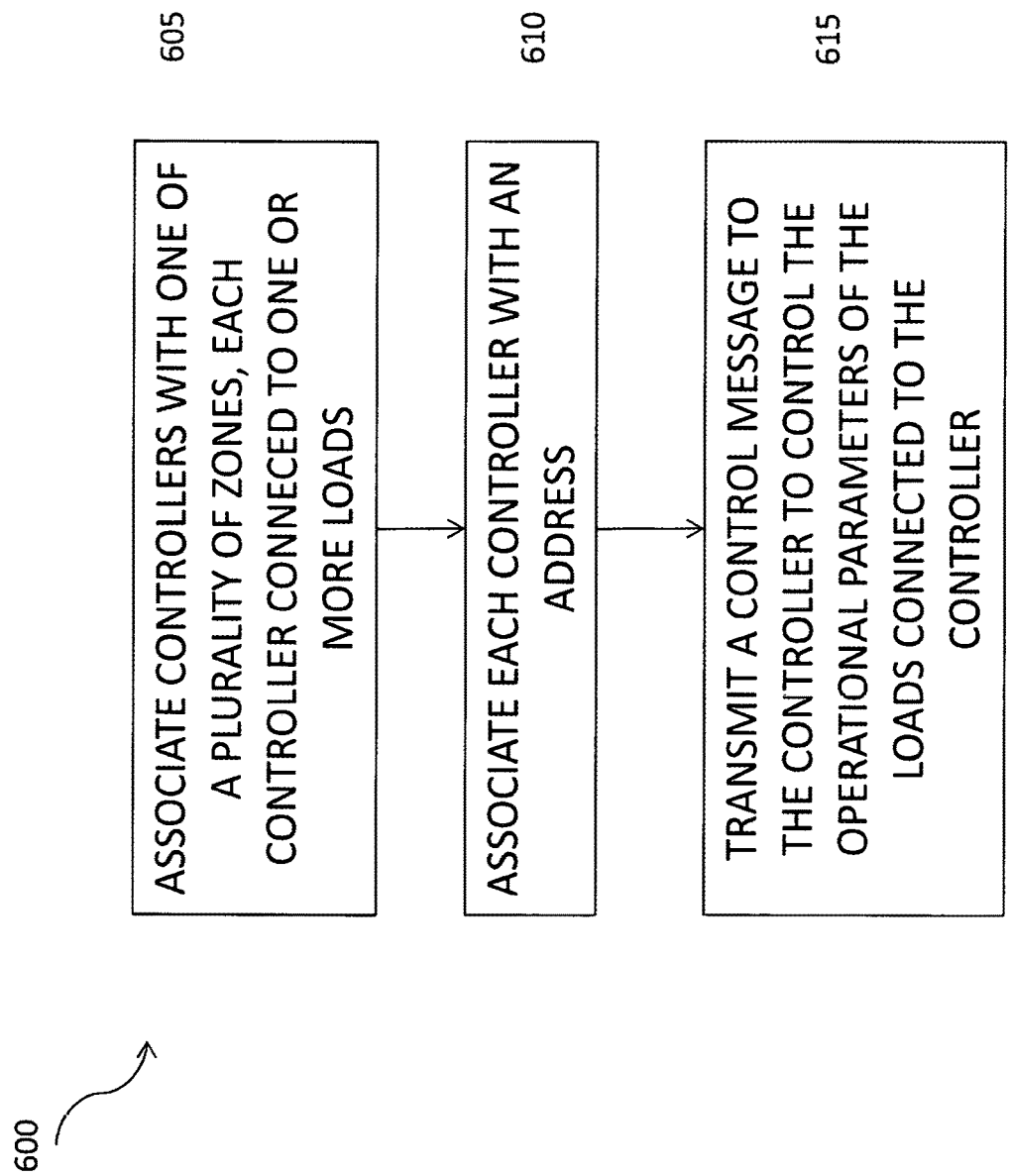
FIG. 6 illustrates a flowchart for transmitting a control message to adjust the operational parameters of one or more loads in a particular zone.

FIG. 6 illustrates a flowchart 600 for transmitting a control message to a controller to change the operational parameters of one or more loads connected to the controller. At 605, a plurality of controllers can be associated with a particular zone in a building. These controllers can, for example, correspond to network lighting controller 225. A zone can correspond to a predefined space in the building. One or more loads can be connected to each controller. A load can, for example, correspond to a lighting unit, a component in an HVAC system, a window covering, and the like. A load can have one or more operational parameters that can be adjusted to change the environmental characteristics of the zone.

At 610, each controller can be associated with an address. This address can be an IP address having a network address and a host identifier. Controllers residing in the same zone can have the same network address.

At 615, a control message can be transmitted to each controller in a first zone. The control message can cause one or more operational parameters of the loads connected to the controllers in the first zone to change. The contents of the control message can be based on one or more policy narratives stored at the main host. When the main host receives sensor data from a particular zone, the main host can determine whether a particular policy narrative applies and generate a control message based on the policy narrative. The operational parameters specified in the control message can include, for example, the illumination intensity of a lighting unit, the degree of opening for a window covering, the position of an air control valve, and the like. This control message can be sent to a broadcast address associated with a subnet of the zone. Alternatively, separate control messages can be individually sent to each controller using the controller's address. The contents of the control message can be based on one or more policy narratives stored at the main host.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A system for controlling loads using an Internet Protocol (IP) network, comprising:
   at least one host, wherein the at least one host is configured to transmit at least one control message over the IP network; and
   a plurality of controllers, wherein:
      each controller is connected to one or more loads,
      each controller is associated with one of a plurality of building zones based on a floor plan of a building, and
      each controller is associated with an IP address such that each controller has a unique IP address, and each unique IP address comprises a network address and a host identifier; and
   wherein:
   a first network address for each of one or more controllers in the first building zone is the same, and is different from at least one other network address of at least one controller not in the first building zone;
   the first building zone is associated with at least first and second subzones, at least two controllers are associated with the first subzone, and at least one other controller is associated with the second subzone; and
   a control message, which includes a first subzone parameter, transmitted over the IP network using a broadcast IP address having the first network address causes one or more operational parameters of the one or more loads connected to each of the at least two controllers associated with the first subzone to change, and does not cause to change one or more operational parameters of the one or more loads connected to the at least one other controller associated with the second subzone.

2. The system of claim 1, wherein another control message, which includes a second subzone parameter, transmitted over the IP network using a broadcast IP address having the first network address, causes one or more operational parameters of the one or more loads connected to each of the at least one controller associated with the second subzone to change, and does not cause to change one or more operational parameters of the one or more loads connected to the at least two controllers associated with the first building zone and not associated with the second subzone.

3. The system of claim 1, wherein the control message is based on environmental data.

4. The system of claim 3, wherein the environmental data is detected by one or more sensors to connected to one or more respective controllers.

5. A method for controlling loads using an Internet Protocol (IP) network, comprising:

a host transmitting a control message, which control message includes a first subzone parameter, over the IP network to a plurality of controllers using a broadcast IP address, wherein:

each controller is connected to one or more loads, is associated with one of a plurality of building zones based on a floor plan of a building, and is associated with an IP address such that each controller has a unique IP address, each unique IP address comprises a network address and a host identifier, a first network address for each of one or more controllers in the first building zone is the same, and is different from at least one other network address of at least one controller not in the first building zone, and the first building zone is associated with at least first and second subzones, at least two controllers are associated with the first subzone, and at least one other controller is associated with the second subzone, and the broadcast IP address has the first network address; and each of the at least two controllers associated with the first subzone causes one or more operational parameters of the one or more loads connected to each of the at least two controllers associated with the first subzone to change in response to the control message; and the at least one other controller associated with the first building zone and not associated with the first subzone does not cause to change, in response to the control message, one or more operational parameters of the one or more loads connected to the at least one other controller.

6. The method of claim 5, further comprising:

the host transmitting another control message, which includes a second subzone parameter, over the IP network using a broadcast IP address having the first network address;

each of the at least one controller associated with the second subzone causes one or more operational parameters of the one or more loads connected to each of the at least one controller to change in response to the control message; and the at least two controllers associated with the first building zone and not associated with the second subzone do not cause to change, in response to the control message, one or more operational parameters of the one or more loads connected to the at least two controllers.

7. The method of claim 5, wherein the control message is based on environmental data.

8. The method of claim 7, wherein the environmental data is detected by one or more sensors to connected to one or more respective controllers.

* * * * *